(12) United States Patent
Bodnar et al.

(10) Patent No.: US 7,463,904 B2
(45) Date of Patent: Dec. 9, 2008

(54) VERSATILE ADAPTOR DEVICE AND MANUFACTURING PROCESS FOR CONNECTING A CLIENT DEVICE TO VARIOUS HOST DEVICES

(75) Inventors: Eric O. Bodnar, Santa Cruz, CA (US); Robin G. Petravic, San Francisco, CA (US); Alan M. Vale, Mountain View, CA (US); Kurt Dammermann, San Francisco, CA (US); Stephen J. Fricke, Felton, CA (US); Steven A. Luzovich, Ben Lomond, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 1104 days.

(21) Appl. No.: 10/013,977

(22) Filed: Dec. 7, 2001

(65) Prior Publication Data

US 2003/0109280 A1    Jun. 12, 2003

(51) Int. Cl.
*H04M 1/00* (2006.01)
*H05K 11/00* (2006.01)
*H04B 7/00* (2006.01)

(52) U.S. Cl. .................. 455/556.1; 455/557; 455/559; 455/344; 455/66.1

(58) Field of Classification Search ............. 455/556.1, 455/557, 559, 344, 66.1
See application file for complete search history.

(56) References Cited

U.S. PATENT DOCUMENTS

| 5,541,686 | A | 7/1996 | Stephenson | 396/164 |
|---|---|---|---|---|
| 5,791,921 | A | 8/1998 | Lee | 439/172 |
| 5,815,426 | A | 9/1998 | Jigour et al. | 365/51 |
| 5,851,123 | A | 12/1998 | Chou | 439/172 |
| 6,034,728 | A | 3/2000 | Arena | 348/372 |
| 6,078,504 | A | 6/2000 | Miles | 361/727 |
| 6,126,462 | A | 10/2000 | Lam | 439/171 |
| 6,151,652 | A * | 11/2000 | Kondo et al. | 713/300 |
| 6,181,954 | B1 * | 1/2001 | Monroe et al. | 455/557 |
| 6,302,717 | B1 | 10/2001 | Cheung | 439/172 |
| 6,400,903 | B1 | 6/2002 | Conoval | 395/56 |
| 6,442,625 | B1 * | 8/2002 | Robinson et al. | 710/8 |
| 6,452,695 | B1 | 9/2002 | Casey et al. | 358/1.6 |
| 6,464,406 | B1 | 10/2002 | Yarita et al. | 385/60 |
| 6,524,137 | B1 | 2/2003 | Liu et al. | 439/638 |

(Continued)

*Primary Examiner*—Barry W Taylor
(74) *Attorney, Agent, or Firm*—Blakely, Sokoloff, Taylor & Zafman, LLP; Judith A. Szepesi

(57) ABSTRACT

A versatile adaptor device to connect together devices having built-in connectors or receptacles for interfacing with other devices is described. Many devices include built-in connectors, which usually consist of proprietary fittings and pinouts/lineouts. The adaptor device connects with the built-in connectors of two devices to enable communication between the two devices. Each end of the adaptor fits physically and electrically with the connectors to join both devices. The body of the adaptor is a double-ended molded plastic part that includes geometry to mate with a particular connector slot at one end and another specific connector slot at the opposing end. The adaptor device may be adapted to connect various different types of devices. For example, the adaptor accommodates connection to an array of brands and models of cellular phone devices at one end of the adaptor and an array of digital cameras at the other end of the adaptor. The manufacture of the adaptors is leveraged because the adaptor employs a minimum common denominator set of circuit lines available to interact with multiple different connectors.

49 Claims, 13 Drawing Sheets

U.S. PATENT DOCUMENTS

| | | | |
|---|---|---|---|
| 2002/0009296 A1* | 1/2002 | Shaper et al. | 396/56 |
| 2002/0115480 A1* | 8/2002 | Huang | 455/573 |
| 2003/0023700 A1* | 1/2003 | Swinton et al. | 709/208 |
| 2003/0052547 A1* | 3/2003 | Fischer et al. | 307/154 |
| 2003/0135681 A1* | 7/2003 | Laity et al. | 710/303 |

* cited by examiner

VERSATILE ADAPTOR DEVICE AND MANUFACTURING PROCESS FOR CONNECTING A CLIENT DEVICE TO VARIOUS HOST DEVICES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to the field of connectable devices and, more particularly, to an adaptor device, including associated manufacturing process thereof, which supports connectivity among wireless and media-processing devices, including for purposes of transmitting digital media.

2. Description of the Background Art

Today, digital imaging, particularly in the form of digital cameras, is a prevalent reality that affords a new way to capture photos using a solid-state image sensor instead of traditional film. A digital camera functions by recording incoming light on sensing mechanisms of some type and then processes that information (basically, through analog-to-digital conversion) to create a memory image of the target picture. A digital camera's biggest advantage is that it creates images digitally thus enabling these images to be transferred between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

A variety of digital image products are currently available to consumers for recording digital images. Regardless of how images are recorded digitally, at some later point in time, the image information must be transferred to a computer or a larger network of digital devices, so that the images may be stored, outputted (e.g., printed to hard copy) or shared with other people. Another reason for transfer of digital images is that current digital cameras typically have rather limited resources. As a result, transfer of the pictures from a digital camera is necessary to free up memory, thereby enabling the digital camera to record and store additional images. As digital image products have become more popular, there is increasing interest in facilitating easy and efficient transfer of images from digital cameras to other larger computing devices (or a network of such computing devices).

Many digital cameras provide wires or cables for transmitting digital images from the camera to another computing device such as a server or a personal computer. However, this transfer requires a physical connection between the camera and the larger computing device. This requirement for a physical (hard-wire) connection is inconvenient for many digital camera users. Frequently, a digital camera user takes photographs when he or she is on vacation, at a sporting event or at some other remote location where he or she does not have easy physical access to computing facilities. Given the limited storage capacities of existing digital cameras, this may result in a limitation on the use (and usefulness) of digital cameras. Without an available mechanism for a user to transfer the images to another computing device, he or she may only be able to take and store a relatively small number of photos on the camera.

More recently, digital camera producers have begun to develop mechanisms for the "wireless" transmission of digital images. The ability of a user to wirelessly transmit digital images provides many of the same advantages currently provided to telephone users by wireless telephone technologies. One of these advantages is that wireless technology enables the digital camera user to upload his or her digital images from a remote location without being required to have a physical connection to a server or network.

The state of the art for "wireless" digital cameras is presently embryonic. Currently, "wireless" digital cameras are not independently wireless-enabled due to cost, weight, power consumption, and other utility factors. To remain lightweight, affordable, electrically charged, and sufficiently handy for taking pictures, current digital cameras do not incorporate the hardware necessary for wireless transmission of their pictures. Instead, digital cameras must be attached to another device to perform this wireless transmission of digital images.

The typical system required in order to transfer digital images wirelessly from a camera device involves coupling the camera to at least a data-capable cellular phone. Frequently, those two separate devices (i.e., the camera and the phone) must also be connected to a third device, such a laptop computer, to facilitate the transfer of digital images. This is necessary because many current cellular phones do not have the ability to handle digital images. In this situation, wireless transmission requires the digital camera to be connected via a cable to the laptop PC, with the laptop PC connected to the cellular phone by a second cable. All this hardware and the manual cable(s) connecting these devices are very cumbersome for a digital camera user to operate.

Recent innovations allow for direct connectivity between digital camera devices and data-capable, or camera-capable, cellular phone devices, bypassing the need for an intermediary laptop device. The ability to connect a cellular-capable digital camera to a data-capable cellular phone is, however, commercially hampered by the lack of standard interfaces on the cellular phones and on the digital cameras. The coupling of a digital camera to a cellular phone is presently implemented with a proprietary cable or adaptor device that does not allow consumers to freely mix-and-match different wireless cameras to different cellular phones. This model-specific, or at least vendor-specific, device dependency is contrary to the usual preference of consumers to select each device based on its own features. Since both cameras and cellular phones are generally used independently of each other (i.e., cellular phones are primarily used for voice communications and digital cameras are primarily used for taking pictures), users tend to select cellular phones with features targeted to placing/receiving phone calls and digital cameras with features targeting image capture.

In addition, many users purchasing digital cameras already have a cellular telephone as cellular telephone technology preceded wireless digital photography in commercial popularity. A consumer that is about to procure his or her first wireless digital camera often already has a particular model of cellular phone tailored to his or her wireless (voice) calling needs. This user does not want to be required to purchase another cellular phone merely as a result of the fact that his or her existing phone is not compatible with the wireless digital camera that he or she has selected. This user also does not want to limit his or her selection of a new wireless digital camera to the few that are compatible with the cellular phone he or she already owns.

Although the foregoing problem has been described in terms of connecting a wireless digital camera to a host cellular phone, it will be appreciated that the problem is more general. Often, it is desirable to connect one class of devices (e.g., PDA devices) to another class of devices (e.g., cellular phones), and do so in a manner that easily accommodates the proprietary features of any particular device.

Because of the ever-increasing popularity of coupling user-operated devices together, such as coupling a handheld imaging device to a handheld wireless communication device, much interest exists in finding a solution to these problems.

GLOSSARY

The following definitions are offered for purposes of illustration, not limitation, in order to assist with understanding the discussion that follows.

ABS: ABS is an acronym for Acrylonitrile-Butadiene-Styrene, a thermoplastic that is tough, hard, and rigid. ABS is used in electronic housings, auto parts, consumer products, pipefittings, waste pipes, computer housings (electroplated on the inside), and automotive interior and exterior trim.

Adaptor (also, Adapter): An adaptor is a device having two (or more) different connecting ends that electrically and physically mates two (or more) other devices (at their own connectors) so those two devices can cooperate as if their own connectors were compatible. An adaptor adapts the connectivity between two other devices.

Connector: A connector is a fitting on the exterior of a device that allows another type of device to connect and communicate with the first device. Therefore, both devices have their own connector. Either device's connector may fit into the other device's connector directly, if they are compatible; otherwise, a third device must adapt the first two devices' connection acting as an intermediary set of two connections. A "connection" typically consists of the mating, or physical and electrical joining of a "male" connector with a "female" connector. The male connector fits into the female connector.

CTS handshake line: CTS is an acronym for "Clear-To-Send." CTS is a single signal coming from a cellular phone, indicating that the phone is ready to receive RS-232 transmit data from a digital camera. It is a "low" true signal, so the camera monitors that signal, and waits for this signal to go low before transmitting the next RS-232 byte.

Data-capable: Cellular phones that are capable of transmitting (and receiving) digital data (packets) across their cellular network to be further distributed over the Internet or private digital networks are said to be "data-capable." Data-capable cellular phones can wirelessly communicate both analog voice streams and digital packets.

LAN: LAN is an acronym for a Local Area Network of computers that spans a relatively small area. Most LANs are confined to a single building or group of buildings. However, one LAN can be connected to other LANs over any distance via telephone lines and radio waves. A system of LANs connected in this way is called a wide area network (WAN).

Pin: A pin is a pronged contact as part of a signal interface in a computer or other communications device. Pins are part of a male connector and plug into a female connector. the number of pins in a connector is sometimes used in describing the connector. The description of the signal associated with each pin is called the pinout.

Pinout: Pinout refers to the physical configuration (e.g., presented via a diagram or table) that describes the purpose of each pin in a multi-pin chip or connection interface, or the purpose of each wire in a cable.

LCP: LCP is an acronym for Liquid Crystal Polymer.

RS-232: RS-232 is short for recommended standard-232, a standard interfaced approved by the Electronic Industries Associated (EIA). Recommended standard-232C was the standard interface originally approved by the EIA for connecting serial devices. In 1987, the EIA released a new version of the standard and changed the name to EIA-232-D. In 1991, the EIA teamed up with Telecommunications Industry Association (TIA) and issued a new version of the standard called EIA/TIA-232-E. This standard is frequently referred to as simply RS-232. Almost all modems conform to this standard and most personal computers have an RS-232 port for connecting a modem or other device. In addition to modems, many display screens, mice, and serial printers are designed to conform to the standard. The RS-232 standard supports two types of connectors—a 25-pin D-type connector (DB-25) and a 9-pin D-type connector (DB-9). The type of serial communication used by most personal computers requires only 9 pins so either type of connector will work equally well. Although RS-232 is still the most common standard for serial communication, the EIA has recently defined successors called RS-422 and RS-423. The new standards are backward compatible so that RS-232 devices can connect to an RS-422 port.

RTS handshake line: RTS is an acronym for "Request-To-Send." RTS is the same as CTS, except that it is the signal from the camera to the phone, telling the phone that the camera is ready to accept RS-232 data from the phone.

WAN: WAN is an acronym for a Wide Area Network. A WAN is a computer network that spans a relatively large geographical area. Typically, a WAN consists of two or more local area networks (LANs). Computers connected to a wide area network are often connected through public networks, such as the telephone system. They can also be connected through leased lines or satellites. The largest WAN in existence is the Internet.

SUMMARY OF THE INVENTION

Often, it is necessary for users to connect together different devices. For example, "wireless" digital cameras currently require a connection to a data-capable cellular phone to upload digital images to a local area network ("LAN") or a wide area network ("WAN"), such as the Internet. Accordingly, it is desirable to provide an improved, cost-effective mechanism for connecting together different user-operated devices, such as connecting a digital camera to a data-capable cellular phone.

The present invention includes an adaptor device and a manufacturing process for an adaptor device to connect together different devices, including user-operated devices such as cameras connected to various cellular phones. To improve cost effectiveness, the present invention exploits features already existing in these devices. In a preferred embodiment employed for connecting a wireless digital camera to cellular phone devices, for example, one finds that both wireless digital cameras and cellular phones have built-in connectors for interfacing with other devices. These connectors usually consist of proprietary (i.e., non-standard) fittings and pinouts. The adaptor device of the present invention connects a particular vendor's camera with a particular type of cellular phone to enable communication to and from the phone from the camera client. These adaptor devices physically and functionally join the camera and phone via their connectors: one end of the adaptor connects with the camera's connector, and the other end of the adaptor connects with the phone's connector. The connected data-capable cellular phones thereby host the camera client's wireless transmission of digital images to the Internet or to private LAN/WAN networks for the purpose of uploading the images to a larger system.

Each end of the adaptor is designed to fit physically and electrically to both the client and host devices. The body of the double-ended adaptor is a molded plastic part that includes a configuration or geometry to mate with the camera-connector slot, and on an opposing side, a configuration or geometry to mate with the specific phone-connector slot. In the preferred embodiment, mechanical mating of the adaptor to the camera and phone devices relies on a mechanical friction fit or loose fit. The currently preferred embodiment of the adaptor includes an orientation/keying feature on the core camera-connector end of the adaptor, and on the camera mating area, that specifies only one correct orientation in which the adaptor can be inserted into the camera. The surfaces of the adaptor on the specific phone side are contoured to provide a better visual mating with specific cellular phones.

In a currently preferred manufacturing process of the present invention (adapted for connecting digital cameras to cellular phones), a wireless digital camera manufacturer may produce (or have produced) various adaptors specific to their camera models that connect these cameras to various data-capable cellular phones. Because it is desirable to connect a manufacturer's line of wireless cameras to an array of brands and models of cellular phone devices for hosting its line of wireless cameras, the "phone end" of the adaptor accommodates each targeted phone's connector to enable communication to and from that particular model of phone. If, for example, the camera product line is intended to connect to seven different cellular phone models, the manufacturing process accommodates seven adaptor types that differ at the "phone end." Although each adaptor type is specific to a targeted cellular phone's connector, the basic manufacturing process is the same for all types of adaptors. The adaptor manufacturing process is itself adaptable to accommodate multiple types of cellular phone hosts. The manufacture of the adaptors is leveraged because the phone end of the adaptors employs a minimum common denominator set of circuit lines available to interact with multiple phone connectors.

DETAILED DESCRIPTION OF A PREFERRED EMBODIMENT

Figure 1:
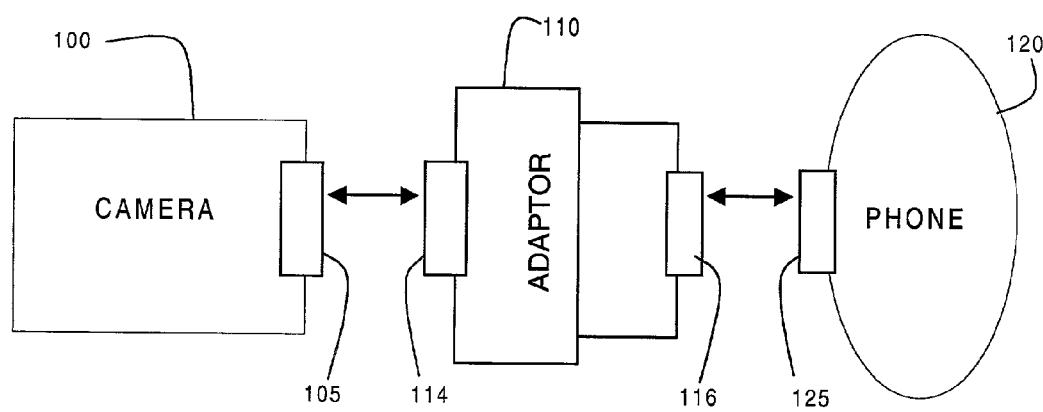
FIG. 1 is a high-level block diagram illustrating the connections between camera and phone devices, using an adaptor device constructed in accordance with the present invention.

The following description will focus on the presently preferred embodiment of the present invention in the environment of a digital camera connected to a data-capable cellular phone. The present invention, however, is not limited to any one particular application or any particular environment. Instead, those skilled in the art will find that the device and methodology of the present invention may be advantageously embodied in a variety of different environments where devices having potentially many different connectors/plugs (e.g., from different manufacturers) are connected together. Therefore, the description of the exemplary embodiments that follows is for purposes of illustration and not limitation.

I. Adaptor Device and Manufacturing Process for Connecting a Wireless Client Device to Various Host Devices A. Overview Cellular phones are designed to operate independently in receiving and transmitting voice messages, without depending upon a connected client device. "Wireless" digital cameras, on the other hand, currently require a connection to a data-capable cellular phone to upload digital images to a local area network ("LAN") or a wide area network ("WAN"), such as the Internet. Accordingly, it is incumbent upon wireless digital camera vendors to provide an effective mechanism for connecting digital cameras to data-capable cellular phones.

The present invention includes an adaptor device and a manufacturing process for an adaptor device. The adaptor device fits into (or otherwise accommodates) the connector of a particular vendor's camera to enable communication to and from the camera as a client. Both wireless digital cameras and cellular phones have built-in connectors for interfacing with other devices. These connectors usually consist of proprietary (i.e., non-standard) fittings and pinouts. The manufacturing process of the present invention enables a wireless digital camera manufacturer to produce various adaptors specific to such vendor's camera models that connect these cameras to various camera-capable cellular phones. These adaptor devices physically and functionally join the camera and phone via their connectors: one end of the adaptor connects with the camera's connector, and the other end of the adaptor connects with the phone's connector. The connected data-capable cellular phones thereby host the camera client's wireless transmission of digital images to the Internet or to private LAN/WAN networks for the purpose of uploading the images to a larger system.

One end of the adaptor device of the present invention accommodates (e.g., fits into) the connector of a particular vendor's camera to enable communication to and from the camera as a client. Each camera vendor typically employs a single connector architecture (or small set of connector architectures) that is standardized across its product line of wireless cellular-capable digital cameras. To discuss the camera-connecting end of the adaptor in general, this document shall refer to the camera side of the connector per se as the "core camera connector." Although described as core, each vendor or manufacturer may manufacture the "camera-end" of its product line of adaptors for its own proprietary camera-connector architecture. Because it is desirable to connect a manufacturer's line of wireless cameras to an array of brands and models of cellular phone devices for hosting its line of wireless cameras, the "phone end" of the adaptor must fit into each targeted phone's connector to enable communication to and from that particular model of phone. Therefore, if the camera product line is, for example, intended to connect to seven different cellular phone models, the manufacturing process accommodates seven adaptor types that differ at the "phone end." Although each adaptor type is specific to a targeted cellular phone's connector, the basic manufacturing process is the same for all types of adaptors. The adaptor manufacturing process is itself adaptable to accommodate multiple types of cellular phone hosts. The manufacture of the adaptors is leveraged because the phone end of the adaptors employs a minimum common denominator set of circuit lines available to interact with the multiple phone connectors.

Each end of the adaptor must ultimately accommodate, physically and electrically, both the client and host devices. In the currently preferred embodiment, the adapter comprises a double-ended adaptor having a body fashioned as a molded plastic part that includes a configuration or geometry to mate with the camera-connector slot, and on an opposing side, a configuration or geometry to mate with the specific phone-connector slot. Generally, the camera and phone connectors are "female" components accepting a matching "male" component, but there is some variation. In the preferred embodiment, mechanical mating of the adaptor to the camera and phone devices relies on a mechanical friction fit or loose fit. The adaptor design preferably includes an orientation/keying feature on the core camera-connector end of the adaptor, and on the camera mating area, that specifies only one correct orientation in which the adaptor can be inserted into the camera. The surfaces of the adaptor on the specific phone side are contoured to provide a better visual mating with the specific phones.

B. Versatile Adaptor for Connecting a Client Device to Various Hosts

1. Adapter Housing Design and Connectivity

In the currently preferred embodiment, four connection fittings, or connectors, are employed for joining the three devices: the camera to the adaptor and the adaptor to the phone. Those skilled in the art will appreciate that the exact number of connection fittings employed may be adapted to accommodate a particular device configuration or application. FIG. 1 is a high-level block diagram illustrating the four connectors employed in the currently preferred embodiment: the camera's connector, the adaptor's core camera connector, the adaptor's target phone connector, and the phone's connector. As shown, FIG. 1 includes a digital camera 100, a camera connector 105 (e.g., built-in to the camera), an adaptor 110, a core camera connector 114 (e.g., built into the adaptor), a target phone connector 116 (e.g., built into the adaptor), a cellular phone 120, and a phone connector 125 (e.g., built into the phone). In use, the (built-in) core camera connector 114 is manually fitted either into or onto the camera connector 105. The target phone connector 116 is manually fitted either into or onto the phone connector 125. Thus, the three devices are compatibly connected to enable the cellular phone 120 to host the wireless transmission of data by the digital camera 100.

Figure 2A:
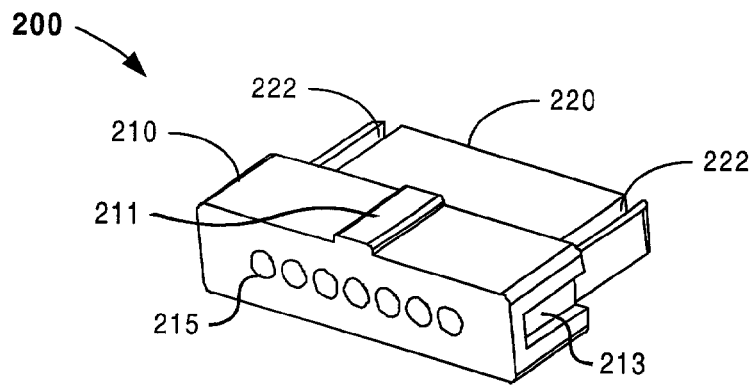
FIGS. 2A-E illustrate an adaptor device constructed in accordance with the present invention.

FIGS. 2A-2E illustrate the housing body of adaptor device 200 of the currently preferred embodiment, scaled to ⅓ size (all dimensions are in centimeters). FIG. 2A is an orthographic top view of adaptor device 200 which includes a core camera connector end 210 and a target phone connector end 220. As shown, the core camera connector end 210 comprises a connector sub-housing, which is a molded plastic part configured as a relatively flat rectangular connecting member as shown in FIG. 2A. Core camera connector end 210 has a tab 211 and two grooves 213 on either side of the core camera connector end (only one groove 213 is visible in the view of FIG. 2A). Tab 211 is a bulge of approximately 4 mm in height located on the top of the core camera connector end 220 that is intended to aid users in correctly aligning adaptor 200 by fitting into a corresponding ridge (not shown) on the body of a camera connector jack. Similarly, the two grooves 213 comprise slots (female members) on either side of the core camera connector end 210. The configuration (or "geometry") of tab 211 and the two grooves 213 facilitate appropriate mating of the adaptor's core camera connector end 210 to a target camera connector jack. A plurality of wire ports (or connectors) 215 are located at the end of core camera connector end 210 (i.e., at the end of the adaptor that is to physically connect to a camera connector). The target phone connector end 220 of adaptor 200 comprises a molded plastic sub-housing containing a subassembly for connection to a particular phone connector (not shown). As shown at FIG. 2A, target phone connector end 220 includes two slots 222 which are grooves (female members) to aid a user in the connection of adaptor 200 to a cellular phone at the cellular phone's connector.

Figure 2B:
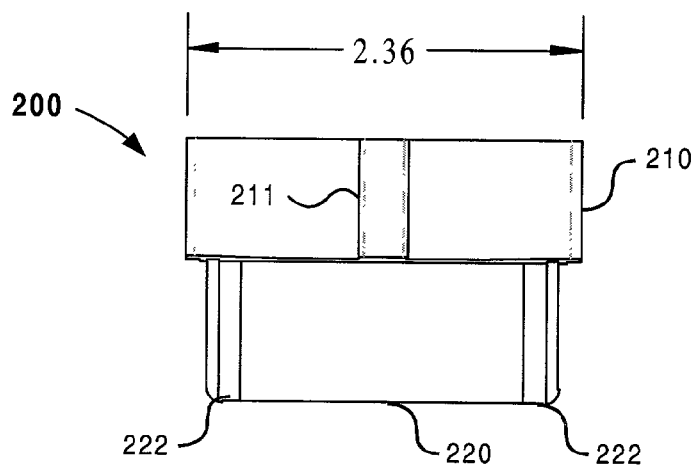

FIG. 2B is an orthogonal top-view of adaptor device 200, showing core camera connector end 210 and phone connector end 220. As shown, in the currently preferred embodiment the core camera connector end 210 is approximately 2.36 centimeters in length from end to end; those skilled in the art will appreciate that these and other dimensions may be varied for a particular application. Tab 211 is shown in the center of the core camera connector end 210 on the top of the housing. FIG. 2B also shows a top view of target phone connector end 220 including two slots 222.

Figure 2C:
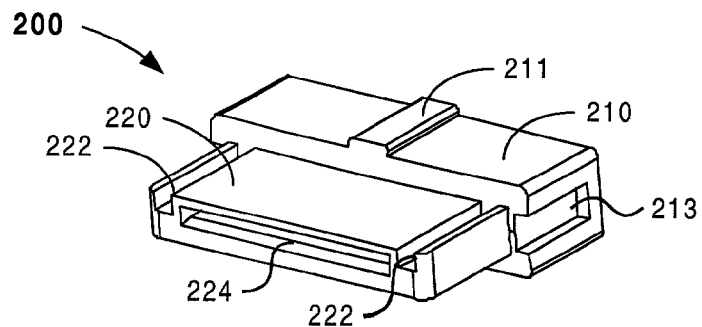

FIG. 2C is a reversed perspective top-view of adaptor device 200. FIG. 2C is oriented to show the front face of the target phone connector end 220 with two slots 222 on the top of target phone connector end 220 and a docking interface receptacle 224. Docking interface receptacle 224 is a rectangular slot (female member) at the end of the phone connector end 220 of the adaptor that accommodates a corresponding male member (not shown) of a particular phone connector. Docking interface receptacle 224 includes a plurality of pins/wire connectors (not shown) for electrical mating with a phone connector of a particular cellular phone. FIG. 2C also includes a reverse perspective top-view of core camera connector end 210, including tab 211 and one groove 213.

Figure 2D:
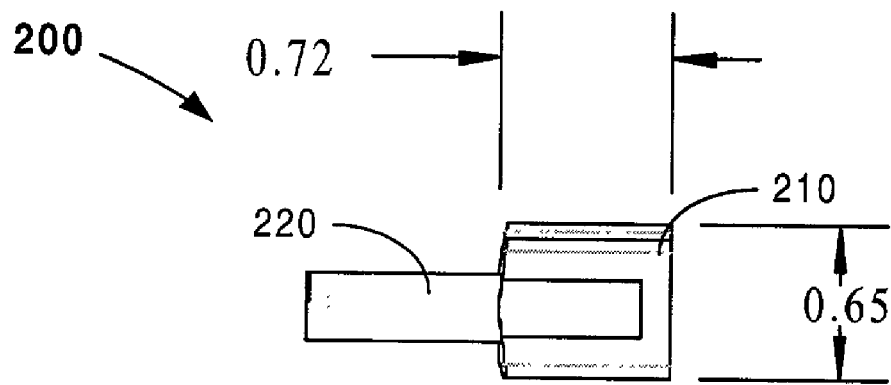

FIG. 2D is an orthographic side-view of adaptor device 200 illustrating the relative size and position of core camera connector end 210 and target phone connector 220. As shown, core camera connector end 210 is, for example, approximately 0.65 centimeters tall and 0.72 centimeters wide in the currently preferred embodiment.

Figure 2E:
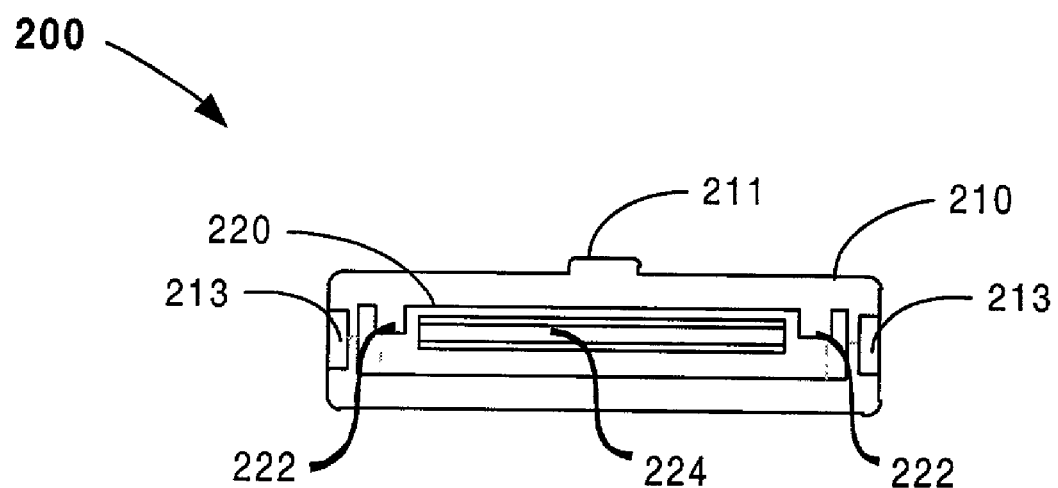

FIG. 2E is an orthographic (target phone connector) end-view of adaptor device 200. FIG. 2E includes a front view of the adaptor's target phone connector end 220, including docking interface receptacle 224 (in the center at FIG. 2E facing out) and two slots 222. Core camera connector end 210, including tab 211, is also illustrated at FIG. 2E. Tab 211, groves 213 and slots 222 depicted in FIGS. 2A-C are examples of suitable mechanical coupling mechanisms for mating the adaptor to phone and camera devices. Other alternative coupling mechanisms (e.g., "snaps," "latches," or the like) capable of providing a sufficiently strong connection between the adaptor and target camera and phone devices may be employed, as desired.

Figure 2F:
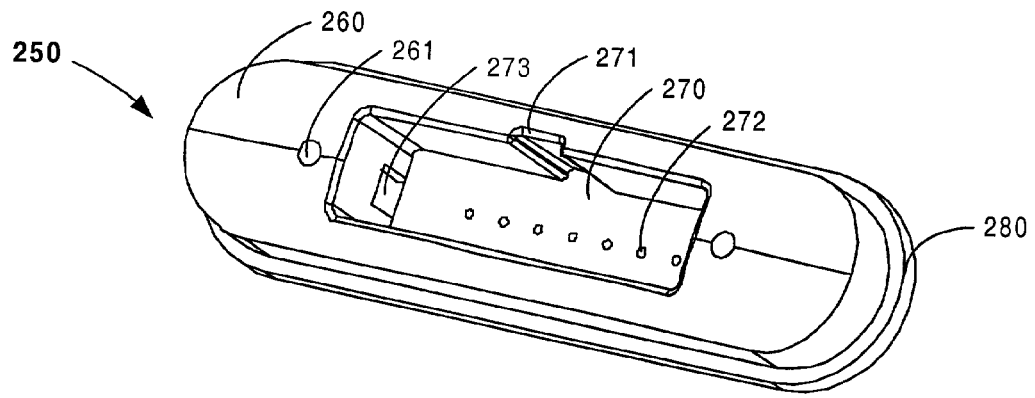
FIGS. 2F-H comprise three views of the connector end of a camera device.

FIG. 2F is a perspective front-view of a camera connector jack 250 of a particular digital camera. As shown at FIG. 2F, camera connector jack 250 includes a housing body 260, a docking (or connector) port 270 and a housing backing 280. Housing body 260 and housing backing 280 comprise a molded plastic part housing a camera connector subassembly. The face of housing body 260 includes two receptacles 261. As shown at FIG. 2F, camera connector jack 250 includes a docking port 270 which is a slot (female member) that accepts the core camera connector end 220 of adaptor 200 (as shown on FIGS. 2A-E). Docking port 270 includes a ridge or receiving member 271 to facilitate mating with a tab on core connector end of the adaptor (e.g., tab 211 as shown at FIG. 2A). Docking port 270 also includes a plurality of connector pins 272 and two indentions or tabs 273 (one of which is shown on the inside of connector slot 270). Housing backing 280 is a molded plastic part that serves as the back portion of the camera connector jack's housing.

Figure 2G:
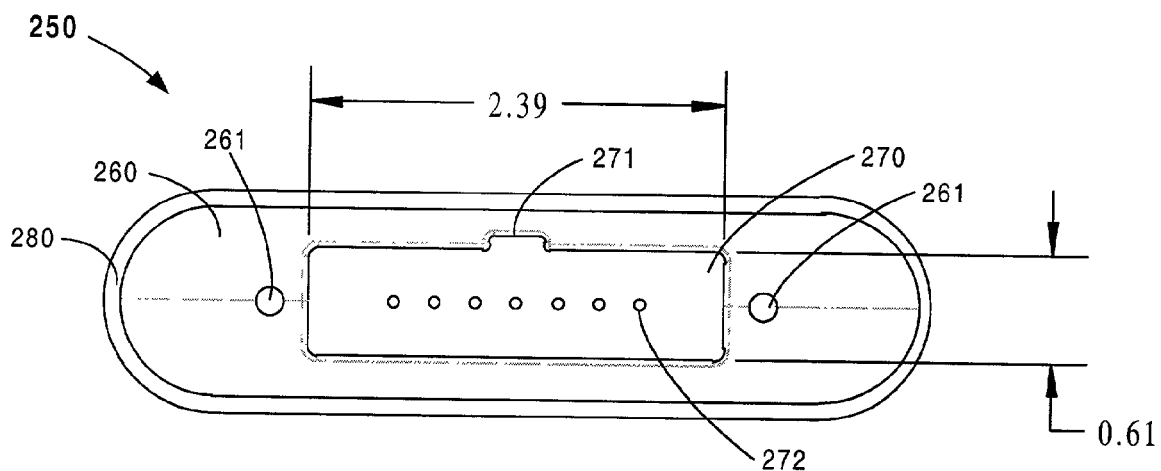
Figure 2H:
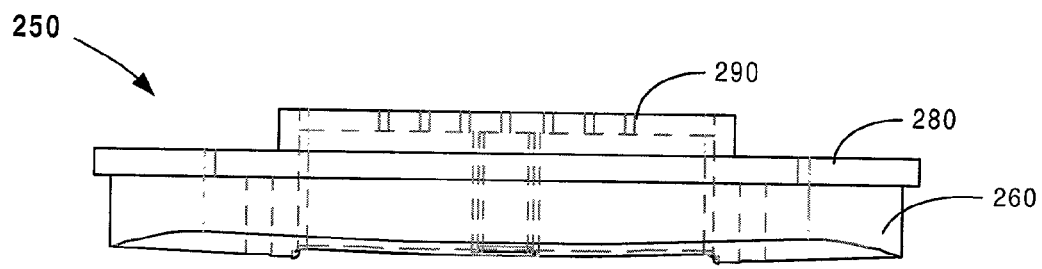

FIG. 2G is an orthographic front-view of the camera's connector jack 250 showing a front view of housing body 260, including two receptacles 261, and docking port 270, including ridge 271 and pins 272. As shown at FIG. 2G, housing backing 280 is connected to housing body 260 to contain the connector subassembly. FIG. 2H is an orthographic top-view of the camera's connector jack 250 showing housing body 260 and housing backing 280. As shown, a portion 290 of the connector jack housing may bulge out on the bottom surface to facilitate attachment.

2. Mating Adapter to a Target Device

Figure 3A:
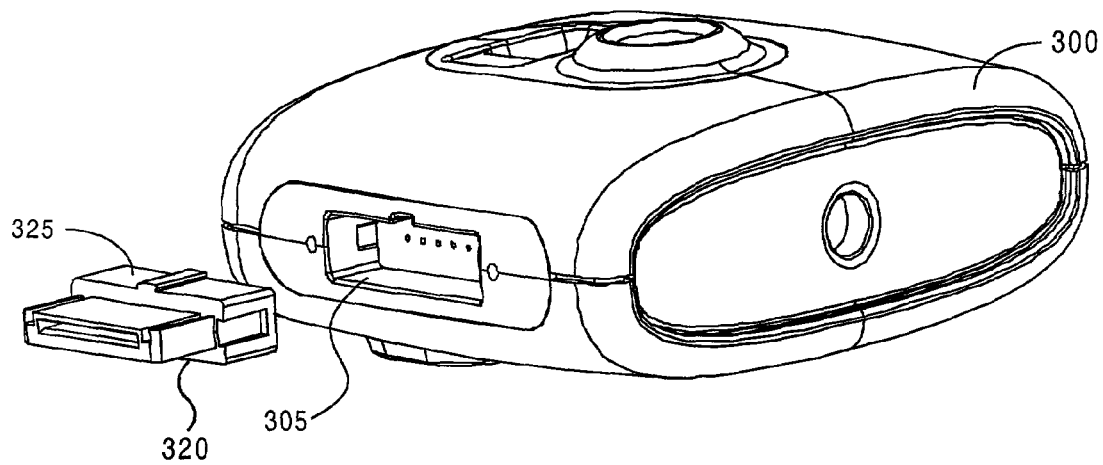
FIGS. 3A-B comprise two illustrations of the relative positions of the camera device and the adaptor device oriented towards fitting their connectors.
Figure 3B:
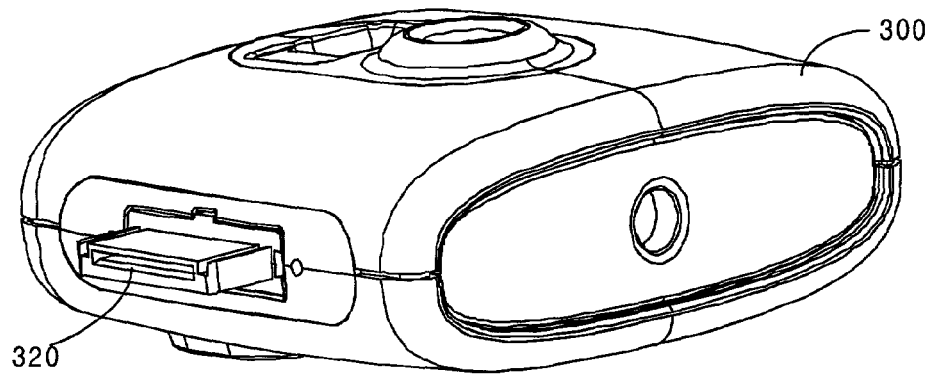

FIGS. 3A-B provide two views of the same adaptor device 320 in different configuration states: an unconnected adaptor in FIG. 3A, and a connected adaptor in FIG. 3B. Thus, the figures illustrate the relative positions of the camera device 300 and adaptor device 320 when the two are mated. FIG. 3A illustrates the adaptor device 320 prior to connecting with the camera device 300. As shown in the figure, a connector jack 305 of the camera device 300 is illustrated prior to connection of the camera with adaptor 320. As also shown, the core camera connector end 325 of adaptor device 320 is oriented towards the camera device 300, and is facing directly towards the camera's connector jack 305. FIG. 3B illustrates adaptor device 320 at the point when it is actually connected to camera device 300. As shown in the figure, the camera connector end of adaptor device 320 is fitted into the connector jack of camera 300.

3. Detailed Circuitry

Figure 4:
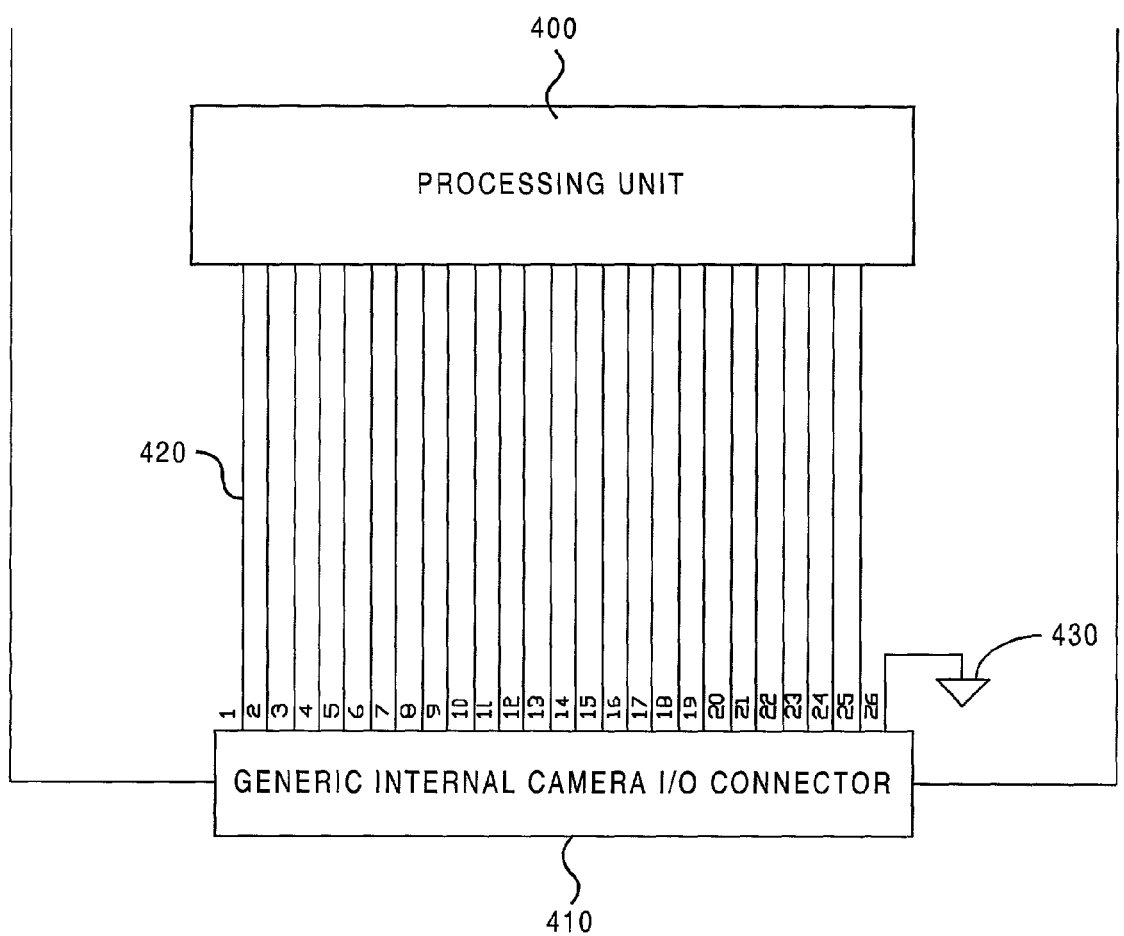
FIG. 4 is a schematic diagram illustrating the internal connector circuitry of the camera device.

FIG. 4 is schematic diagram illustrating the internal connector circuitry of the camera device. FIG. 4 illustrates the logical circuitry 400 (referred to as the "processing unit," as this detail is not relevant to the purposes of this disclosure), the camera's internal I/O connection jack 410, the 25 internal wires 420 connecting the processing unit 400 to the pinouts in the camera's internal I/O connector 410, and the ground 430 (pin number 26).

The present invention contemplates alternative circuits for the adaptor device. The following will illustrate different exemplary circuits for connecting to different target cellular phone models with which the adaptor device may be used. The target cellular phones include, for example, a Motorola L7089 cellular phone and a Motorola Accompli 008 cellular phone. All wiring illustrations designate the set of pinouts in the adaptor device for connecting to the camera as J1, for "jack number one," of two connection jacks. All wiring illustrations designate the set of pinouts in the adaptor device for connecting to the specific phone device as J2, for "jack number two," of two connection jacks.

a) First Alternative Circuitry Embodiment

Figure 5A:
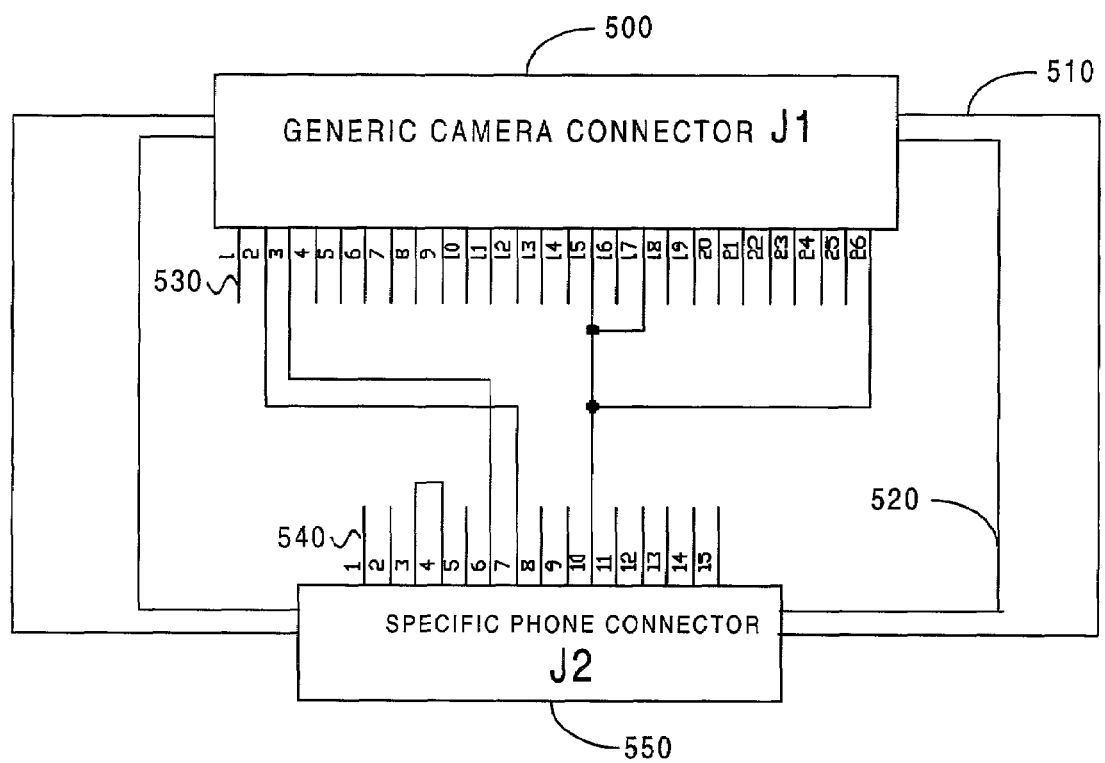
FIG. 5A is a schematic diagram illustrating a first alternative circuitry embodiment of the connections among the camera device, the adaptor device for a Motorola Accompli 008 cellular phone, and a Motorola Accompli 008 cellular phone.
Figure 5B:
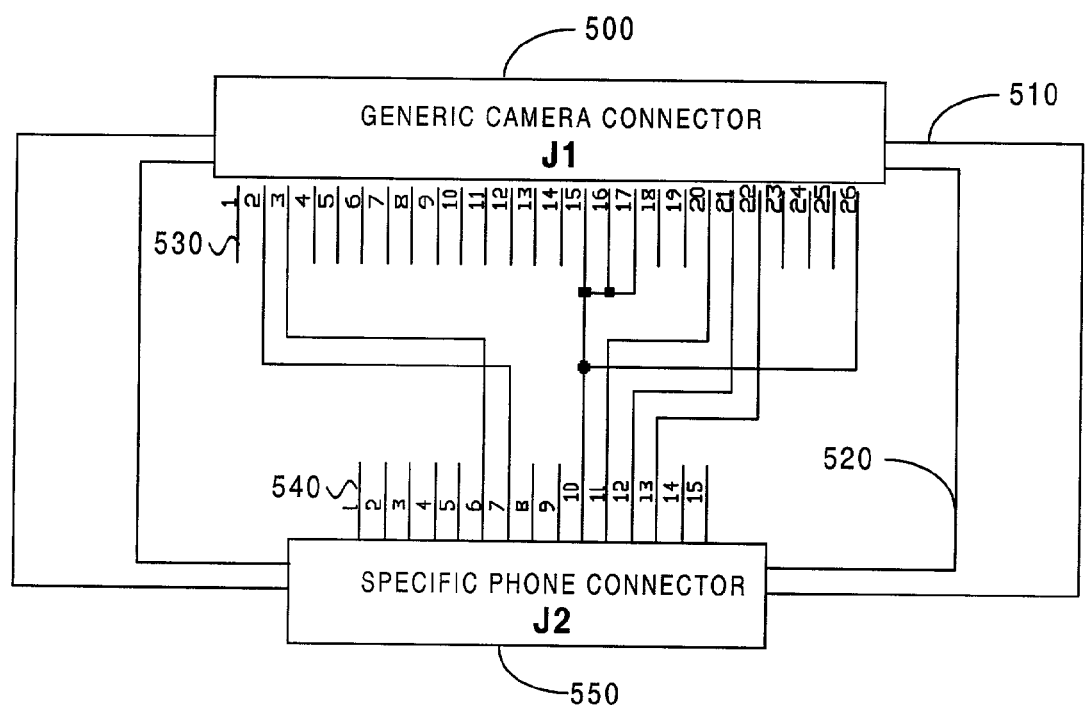
FIG. 5B is a schematic diagram illustrating the first alternative circuitry embodiment of the connections among the camera device, the adaptor device for a Motorola L7089 cellular phone, and a Motorola L7089 cellular phone.

The first alternative wiring embodiment is follows: the plastic connector body contains a sub-assembly comprising a phone specific connector, a printed circuit board (PCB), and the core connector. This sub-assembly is contained by a plastic housing. The purpose of the PCB is to compensate for the desire that the core connector remain generic (finite number of pinout contacts at one set pitch), while specific phone connectors with varying pin locations and numbers with varying pitches can be accommodated by assembling both connectors to a PCB that, through specifically routed traces, connects the pins on the phone connector to the appropriate pins on the core connector. FIGS. 5A-B illustrate this embodiment: FIG. 5A for connecting the camera and adaptor to a Motorola L7089 cellular phone, and FIG. 5B for connecting the camera and adaptor to a Motorola Accompli 008 cellular phone.

FIG. 5A illustrates the adaptor device configured for the Motorola L7089 cellular phone. FIG. 5A shows a core camera connector (J1) 500, a housing body 510, a PCB 520, 26 pins 530 to a core camera connector 500, a specific phone connector jack (J2) 550, and 15 pins 540 to the specific phone connector jack (J2) 550. The relevant pin functions are as follows:

1. J1 pins 15 and 17: module select inputs.
2. J2 pin 6: receives data from phone to camera.
3. J2 pin 7: transmits data from camera to phone.
4. J1 pin 26: ground.

As FIG. 5A illustrates, the following circuit connections are made between the two connectors in the adaptor device:

1. J1 pin 2 connects to J2 pin 7.
2. J1 pin 3 connects to J2 pin 6.
3. J1 pins 15, 17, and 26 (ground) connect to J2 pin 10.
4. J2 pins 3 and 4 are connected together.

FIG. 5B illustrates the adaptor device configured for the Motorola Accompli 008 cellular phone. FIG. 5B shows a core camera connector jack (J1) 500, a housing body 510, a PCB 520, 26 pins 530 to the core camera connector jack (J1) 500, a specific phone connector jack (J2) 550, and 15 pins 540 to the specific phone connector jack (J2) 550. The relevant pin functions are as follows:

1. J1 pin 15, 16 and 17: module select inputs.
2. J2 pin 6: receives data from phone to camera.
3. J2 pin 7: transmits data from camera to phone.

4. J2 pin 10: ground.
5. J2 pin 11: RTS handshake line.
6. J2 pin 12: both device ID and CTS handshake.
7. J2 pin 13: device ID output to phone.

As FIG. 5B illustrates, the following circuit connections are made among the two connectors in the adaptor device:
1. J1 pin 2 connects to J2 pin 7.
2. J1 pin 3 connects to J2 pin 6.
3. J1 pins 15, 16, 17, and 26 connect to J2 pin 10.
4. J1 pin 20 connects to J2 pin 11.
5. J1 pin 21 connects to J2 pin 12.
6. J1 pin 22 connects to J2 pin 13.

b) Second Alternative Circuitry Embodiment

A second alternative wiring embodiment may be constructed as follows: the plastic connector body contains metal contacts that make contact on the one side with the phone connector, and on the opposite side make contact with the camera connector. The pitch and dimensions of these pins may vary according to the pitch and dimensions as defined by the specific phone connector. No printed circuit board (PCB) is included in the adaptor in this second alternative wiring embodiment. In order to compensate for varying pitch and locations of specific pins on different phone connectors, the core camera connector may reserve certain sections according to specific phone connectors. Similarly, the camera PCB has multiple sets of traces for each set of pins.

Figure 6:
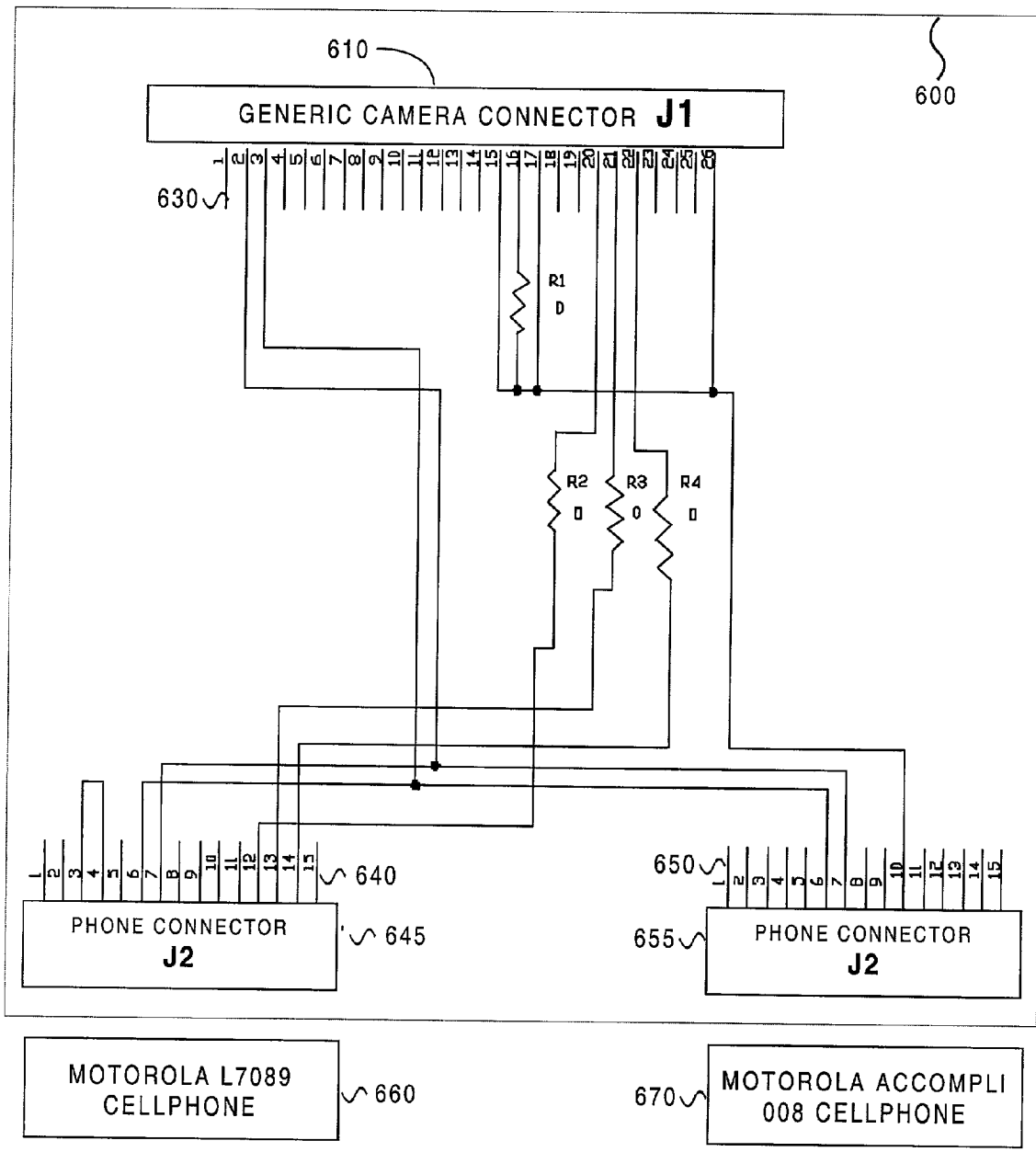
FIG. 6 is a schematic diagram illustrating a second alternative circuitry embodiment of the connections amongst the camera device, the adaptor device for the Motorola L7089 cellular phone, the Motorola L7089 cellular phone, the adaptor device for the Accompli 008 cellular phone, and the Motorola Accompli 008 cellular phone.

FIG. 6 illustrates this embodiment: a J2 phone connector 645 (bottom left) is wired to interface a camera and adaptor to a Motorola L7089 cellular phone, and a J2 phone connector 655 (bottom right) is wired to interface a camera and adaptor to a Motorola Accompli 008 cellular phone. This manifestation of the adaptor is not designed to interface with both types of Motorola cellular phones; rather FIG. 6 illustrates two distinct circuits in a single diagram. There are only 2 connector jacks to this manifestation: J1 and J2. FIG. 6 includes adaptor device 600, a core camera connector jack (J1) 610, 26 pins 630 to the core camera connector (J1) 610, a specific phone connector jack (J2) 645, and 15 pins 640 to the specific phone connector jack (J2) 645 for connection to the external Motorola L7089 cellular phone 660 shown at the bottom left of FIG. 6 (this phone 660 is aligned for connecting to the adaptor at phone connector (J2) 645). Alternatively a specific phone connector jack (J2) 655, and 15 pins 650 to the specific phone connector jack (J2) 655 illustrates the circuitry for connecting to an external Motorola Accompli 008 cellular phone 670 shown at the bottom right of FIG. 6 (this phone 670 is aligned for connecting to the alternative version of the adaptor at phone connector (J2) 655).

The relevant pin functions for connecting this manifestation of the adaptor to the Motorola L7089 cellular phone are as follows:
1. J1 pins 15 and 17: module select inputs.
2. J2 pin 6: receives data from phone to camera.
3. J2 pin 7: transmits data from camera to phone.
4. J1 pin 26: ground.

As FIG. 6 illustrates, the following circuit connections are made between the two connectors in the adaptor device to interface with the Motorola L7089 cellular phone:
1. J1 pin 2 connects to J2 pin 7.
2. J1 pin 3 connects to J2 pin 6.
3. J1 pin 20 connects to J2 pin 12.
4. J1 pin 21 connects to J2 pin 13.
5. J1 pin 22 connects to J2 pin 14.
6. J2 pins 3 and 4 are connected together.

The relevant pin functions for connecting this manifestation of the adaptor to the Motorola Accompli 008 cellular phone are as follows:
1. J1 pins 15, 16, and 17: module select inputs.
2. J2 pin 6: receives data from phone to camera.
3. J2 pin 7: transmits data from camera to phone.
4. J2 pin 11: RTS handshake line.
5. J2 pin 12: both device ID and CTS handshake.
6. J2 pin 13: device ID output to phone.
7. J2 pin 10: ground.

As FIG. 6 illustrates, the following circuit connections are made between the two connectors in the adaptor device to interface with the Motorola Accompli 008 cellular phone:
1. J1 pin 2 connects to J2 pin 7.
2. J1 pin 3 connects to J2 pin 6.
3. J1 pins 15, 16, 17, and 26 (ground) connect to J2 pin 10 (ground).

c) Third Alternative Circuitry Embodiment

A third alternative wiring embodiment may be constructed as follows: a plastic connector body contains a sub-assembly consisting of a phone specific connector (J2), a PCB, and a core camera connector. The plastic connector body is a plastic housing that contains this sub-assembly. The purpose of the PCB in this subassembly is to enable the core camera connector to remain generic (finite number of pinout contacts at one set pitch). The PCB can be routed so that phones that use the same connector jack, though using different pinouts, can be accommodated by mounting shunt resistors (acting as jumpers) in the appropriate locations on the PCB. However, phones with different connector jacks require different PCB layouts because of variations in connector contact dimensions and pitch.

Figure 7:
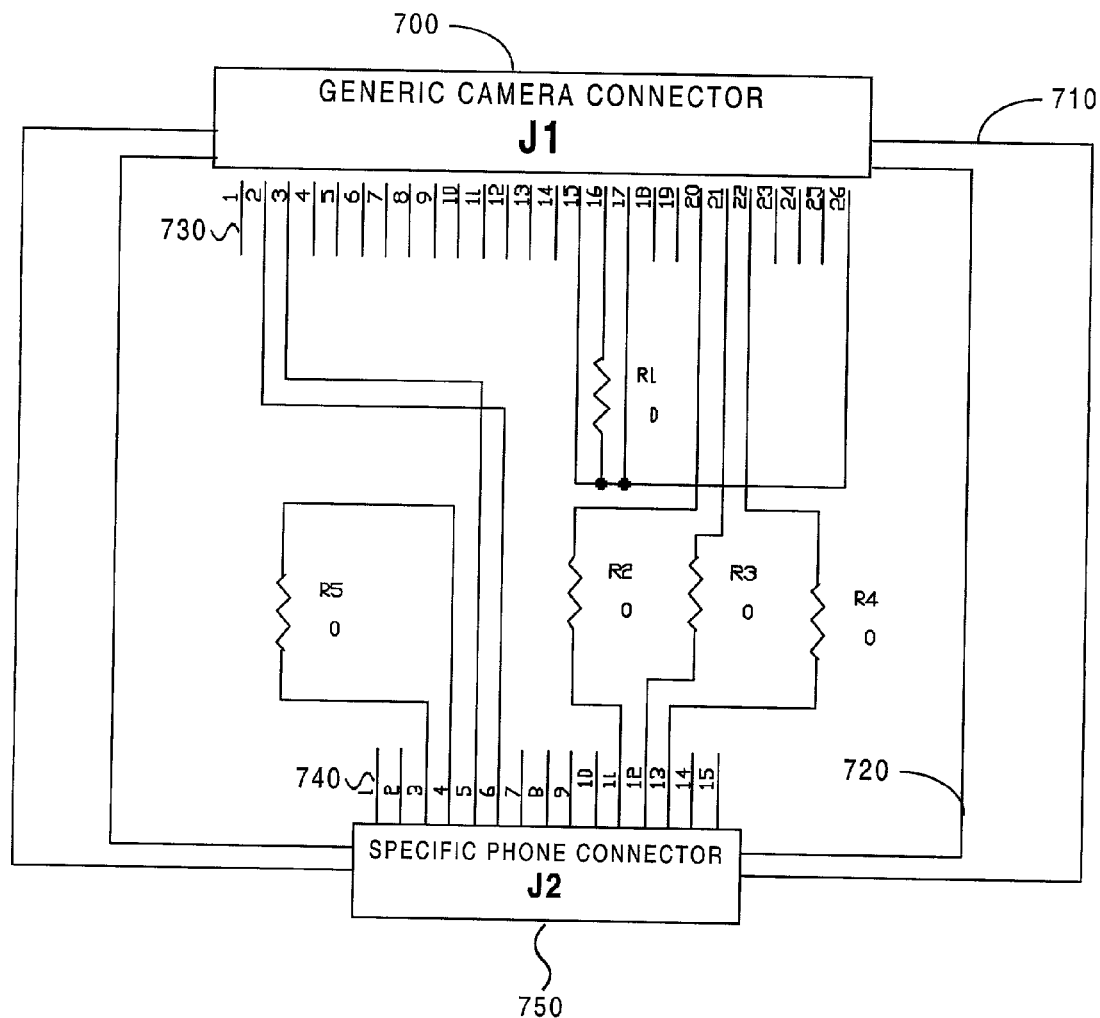
FIG. 7 is a schematic diagram illustrating the third alternative circuitry embodiment of the connections amongst the camera device, the adaptor device for the Motorola L7089 cellular phone, the Motorola L7089 cellular phone, the adaptor device for the Accompli 008 cellular phone, and the Motorola Accompli 008 cellular phone.

FIG. 7 illustrates this embodiment. FIG. 7 shows a core camera connector (J1) 700, a plastic housing body 710, a PCB 720, 26 pins 730 to the core camera connector (J1) 700, a specific phone connector jack (J2) 750, and 5 pins 740 to the specific phone connector (J2) 750.

The relevant pin functions for connecting this manifestation of the adaptor to a Motorola L7089 cellular phone are as follows:
1. J1 pins 15 and 17: module select inputs.
2. J2 pin 6: receives data from phone to camera.
3. J2 pin 7: transmits data from camera to phone.
4. J1 pin 26: ground.

As FIG. 7 illustrates, the following circuit connections are made between the two connectors in the adaptor device to interface with the Motorola L7089 cellular phone:
1. J1 pin 2 connects to J2 pin 6.
2. J1 pin 3 connects to J2 pin 5.
3. J1 pin 15 connects to J2 pin 12.
4. J2 pins 3 and 4 are connected together, with R5 installed.
5. R1-R5 are resistors.

The relevant pin functions for connecting this manifestation of the adaptor to a Motorola Accompli 008 cellular phone are as follows:
1. J1 pins 15, 16, and 17: module select inputs.
2. J1 pin 26: ground.
3. J2 pin 6: receives data from phone to camera.
4. J2 pin 7: transmits data from camera to phone.
5. J2 pin 11: RTS handshake line.
6. J2 pin 12: this has a dual function: device ID and CTS handshake.
7. J2 pin 13: device ID output to phone.
8. J2 pins 15, 16, 17: module select inputs.

As FIG. 7 illustrates, the following circuit connections are made between the two connectors in the adaptor device to interface with the Accompli 008 cellular phone:
1. J1 pin 2 connects to J2 pin 6.
2. J1 pin 3 connects to J2 pin 5.
3. J1 pin 15 connects to J2 pin 12.
4. J1 pins 15, 16, 17, and 26 are connected together, with R1 installed at J1 pin 16.
5. J1 pin 20 connects to J2 pin 11, with R2 installed.
6. J1 pin 21 connects to J2 pin 12, with R3 installed.
7. J1 pin 22 connects to J2 pin 13, with R4 installed.
8. J2 pins 3 and 4 are connected together, with R5 installed.

4. Mechanical Manifestations

The body of the currently preferred embodiment of the adaptor of the present invention is a double-ended molded plastic part that consists of geometry to mate with the camera connector jack, and on the opposing side, geometry to mate with the specific phone connector jack. In its most basic manifestation, mechanical mating of the connector to the camera relies on a mechanical friction fit or loose fit. The plastic body contains all necessary electrical components. The currently preferred embodiment relies on friction due to the tight fitting of the adaptor with the camera to maintain (temporary) connectivity between the client and host devices. The surfaces of the connectors on the adaptor may also be contoured on the sides facing the connected devices to provide a better visual mating with connector jacks of specific devices, such as the connector jacks of specific cellular phones or digital camera models.

Alternatively, or in addition to, the above, "snap" or "latch" features may be employed on the adaptor, on one or both of the connected devices, or on some combination thereof to mechanically mate the adaptor and these devices. For example, latch features may be included on the core connector area that lock into designated features on the connector of a camera. If such latch features are engaged, the adaptor cannot be removed from the camera connector without some permanent damage to the connector or camera parts. The consumer could select the appropriate adaptor for his or her new wireless camera at the point of sale, and subsequently install the adaptor into the camera manually.

These latch features may also include a "button" feature on the adaptor or the connected devices to enable the latch features to be engaged or disengaged. For example, manipulation of a specific button on the adaptor may release the latch features connecting the adaptor to a digital camera. Alternatively, the release button may be located on the camera rather than on the adaptor. These "latch" features could also include designated features on the adaptor or the connected devices that enable the adaptor to be removed with the use of a specific tool to manipulate the release of the latch features.

5. Manufacturing Process for Multiple Adaptors

The adaptor may be manufactured using methods common in the connector industry. The present invention provides three alternative manufacturing embodiments, each of which is pertinent to the three possible electrical embodiments previously described. A potential vendor for all three possible connector manifestations is Foxconn, part of: Hon Hai Precision Industry Co., Ltd., 2, Tzu Yu Street, Tu-Chen, Taipei Hsien, 23606, Taiwan, R.O.C.

a) First Alternative Manufacturing Embodiment

Figure 8:
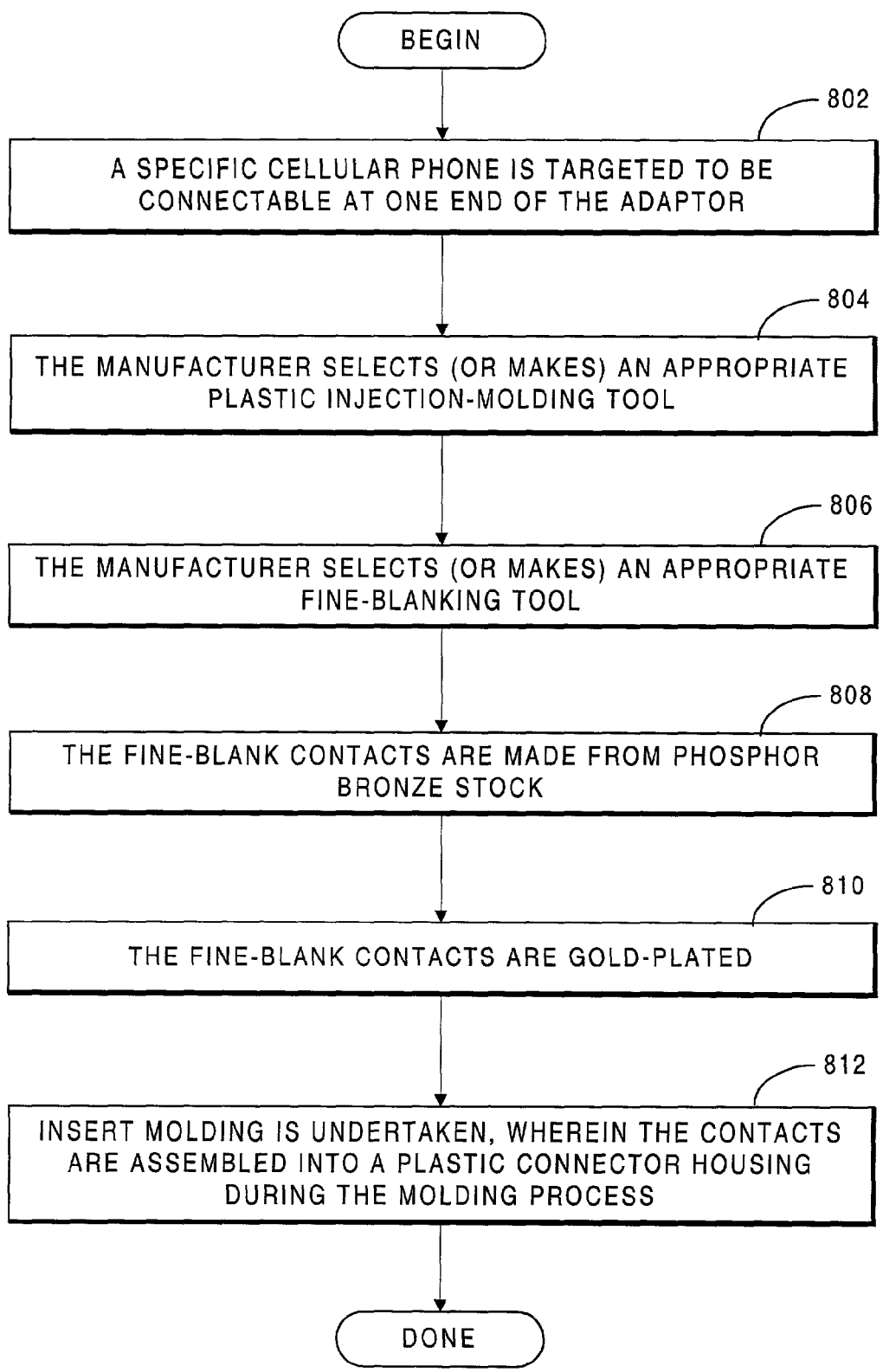
FIG. 8 is a flowchart indicating the sequence of steps involved in the first alternative embodiment of the manufacturing process of the adaptor device.

The entire adaptor is manufactured using standard manufacturing techniques commonly employed by the connector industry. FIG. 8 is a flowchart indicating the sequence of steps involved in the manufacturing process of an adaptor that does not include a printed circuit board (PCB) sub-assembly. This manufacturing process is for the second alternative wiring embodiment as illustrated at FIG. 6. At step 802, the manufacturer selects a specific model cellular phone that the new adaptor will be able to connect to at one end; e.g., a Motorola Accompli 008. At step 804, the manufacturer selects an existing plastic injection-molding tool (e.g., pre-existing or custom designed) appropriate to the design of the adaptor. At step 806, the manufacturer selects an existing fine-blanking tool (again, pre-existing or custom designed) appropriate to the design of the metal contacts of the adaptor. At step 808, the contacts are fine blanked from phosphor bronze stock. At step 810, those contacts are gold-plated. At step 812, the metal contacts (phosphor bronze with gold plating) are assembled as part of the plastic housing (thermoplastic LCP-UL94 rating) through an insert molding process.

b) Second Alternative Manufacturing Embodiment

Figure 9:
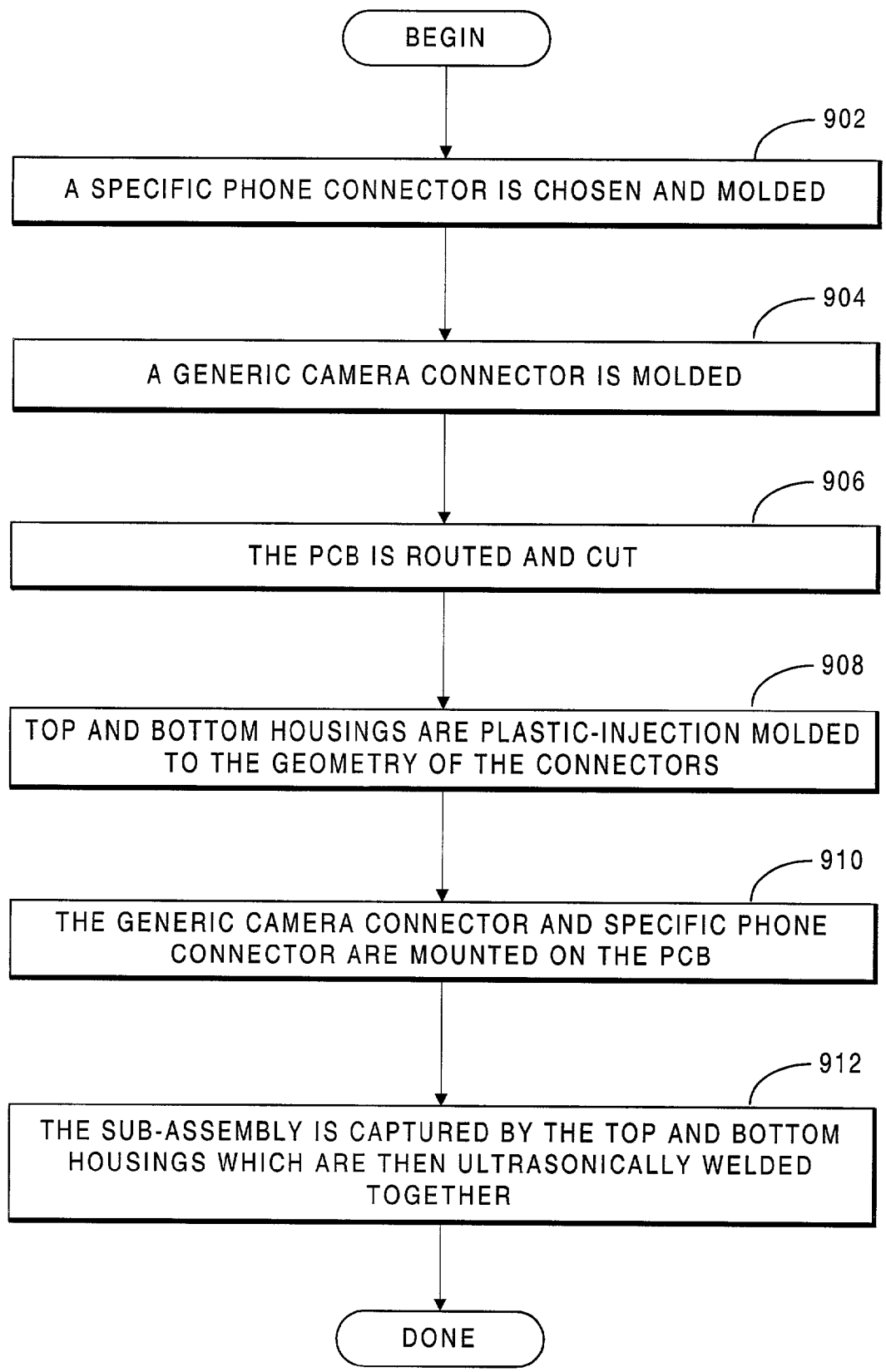
FIG. 9 is a flowchart indicating the sequence of steps involved in the second alternative embodiment of the manufacturing process of the adaptor device.

The sub-assembly is manufactured using methods common in the connector industry. The phone specific connector and core camera connectors are manufactured as described in the previous manufacturing embodiment. FIG. 9 is a flowchart indicating the sequence of steps involved in this manufacturing process. At step 902, the specific phone connector for the targeted cellular phone is molded as described in the previous manufacturing embodiment. At step 904, the core camera connector is also molded. At step 906, the PCB (2 layer minimum FR4) is routed and cut using common PCB manufacturing methods. At step 908, the top and bottom halves of the housing are injection molded (PC/ABS blend) according to the specific geometry as determined by the connectors. At step 910, the two connectors are mounted and soldered to the PCB, and this sub-assembly is captured by the top and bottom housing parts. At step 912, the housings are ultrasonically welded together to form a captive assembly.

c) Third Alternative Manufacturing Embodiment

Figure 10:
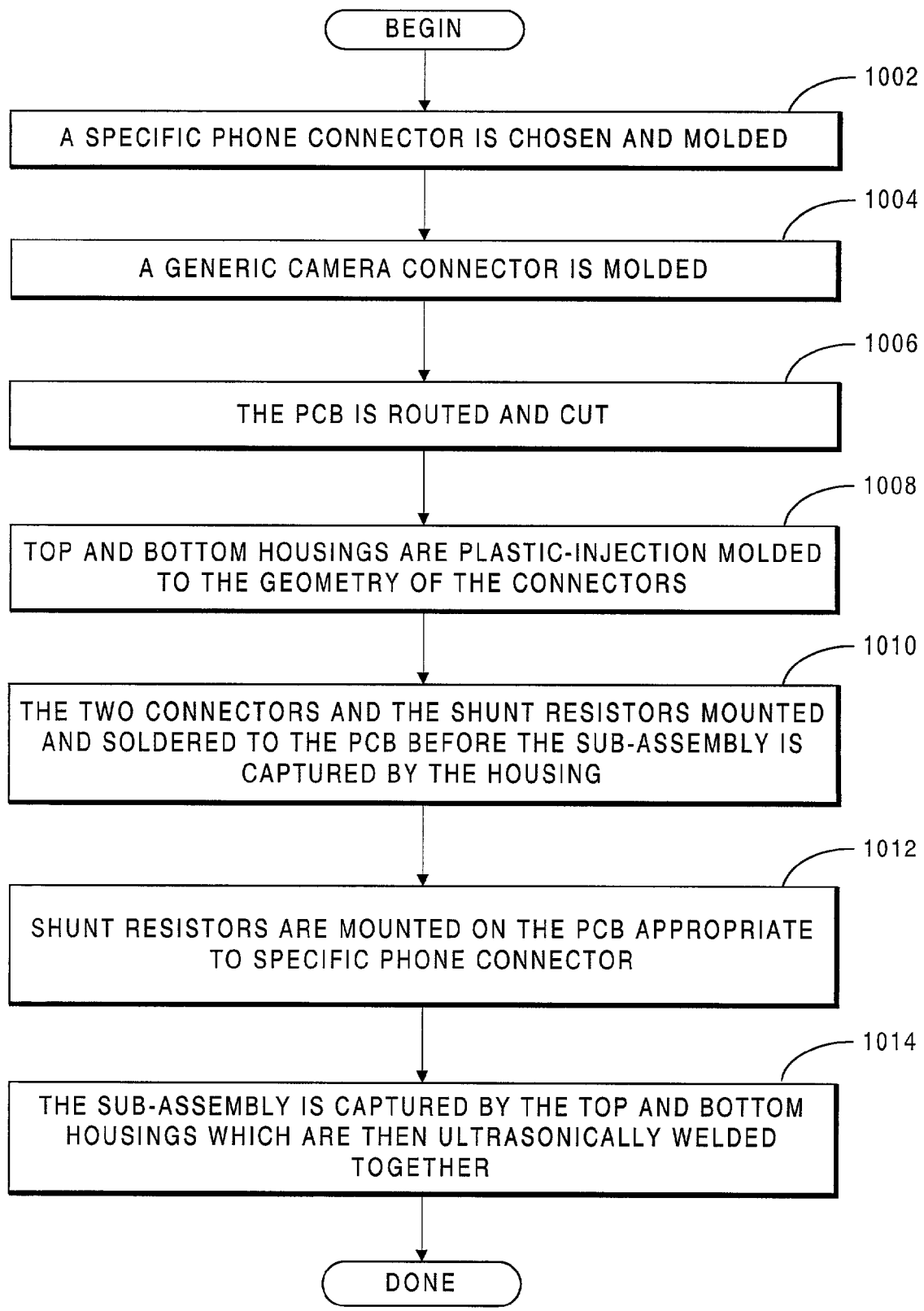
FIG. 10 is a flowchart indicating the sequence of steps involved in the third alternative embodiment of the manufacturing process of the adaptor device.

The sub-assembly is manufactured using methods common in the connector industry. FIG. 10 is a flowchart indicating the sequence of steps involved in this manufacturing process. At step 1002, the specific phone connector for the targeted cellular phone is molded as described in the previous manufacturing embodiment. At step 1004, the core camera connector is also molded. At step 1006, the PCB (2 layer minimum FR4) is routed and cut using common PCB manufacturing methods. At step 1008, the top and bottom halves of the housing are injection molded (PC/ABS blend) according to the specific geometry as determined by the connectors. At step 1010, the two connectors and the shunt resistors are mounted and soldered to the PCB before the sub-assembly is captured by the housing. At step 1012, shunt resistors are mounted on the PCB appropriate to the specific phone connector. At step 1014, the housings are ultrasonically welded together to form a captive assembly.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. An adaptor device for joining a client device and a host device, said adaptor device comprising:
a core connector of the adaptor device providing connectivity to a client device;
connector circuitry of the adaptor device for connecting said core connector to various target connectors, each target connector supporting a given host device, the connector circuitry including a plurality of circuits to route data to a target connector, based on an identity of the target connector selectively connected to said connector circuitry and the host device, wherein the plurality of circuits employ a minimum common denominator set of circuit lines to interact with each of a plurality of host devices that fit the target connector; and
at least one target connector selectively connected to said connector circuitry, said target connector supporting connection of the adaptor to a host device for which connectivity to the client device is desired.

2. The device of claim 1, wherein said client device is a digital camera and said host device is a cellular telephone.

3. The device of claim 2, wherein said adaptor device enables wireless transmission of digital images from said digital camera through said cellular telephone.

4. The device of claim 1, wherein said adaptor device comprises a single integrated unit containing said core connector, said connector circuitry, and a target connector to a host device.

5. The device of claim 1, wherein said adaptor device is contained within a molded plastic body housing.

6. The device of claim 5, wherein said molded plastic body housing is double-ended.

7. The device of claim 1, wherein said adaptor device comprises two separate units, a first unit containing said core connector and said connector circuitry, and a second unit containing a target connector to a host device.

8. The device of claim 7, wherein said first unit may be connected to a plurality of target connectors for purposes of connecting to a plurality of host devices.

9. The device of claim 8, further comprising: a plurality of target connectors for purposes of connecting to a plurality of host devices.

10. The device of claim 1, wherein said adaptor device includes geometry on at least one end to mate with said client device.

11. The device of claim 1, wherein said adaptor device includes geometry on at least one end to mate with said host device.

12. The device of claim 1, wherein said adaptor device relies on mechanical friction to maintain connectivity to said client device.

13. The device of claim 1, further comprising:
latch features on said adaptor device for maintaining connectivity with said client device.

14. The device of claim 1, further comprising:
latch features on said adaptor device for maintaining connectivity with said host device.

15. The device of claim 1, wherein at least one side of said adaptor device includes contoured surfaces to facilitate mating of said adaptor to said client device.

16. The device of claim 1, wherein at least one side of said adaptor device includes contoured surfaces to facilitate mating of said adaptor to said host device.

17. The device of claim 1, wherein said core connector to said client device includes at least 15 pin contacts.

18. The device of claim 1, wherein said target connector to said host device includes at least 26 pin contacts.

19. The device of claim 1, wherein said host device comprises a selected one of a Motorola L7089 cellular phone and a Motorola Accompli 008 Cellular phone.

20. The device of claim 1, wherein said connector circuitry connects said core connector to said at least one target connector through specifically routed traces.

21. The device of claim 1, wherein said connector circuitry is adaptable to accommodate different connector contact dimensions and pitches.

22. The device of claim 1, wherein said connector circuitry comprises a printed circuit board (PCB).

23. The device of claim 22, wherein said PCB includes shunt resistors, acting as jumpers, to accommodate a plurality of target connectors.

24. The device of claim 1, wherein said connector circuitry includes shunt resistors to accommodate a plurality of target connectors having different connector pinouts.

25. The adaptor device of claim 1, wherein the connector circuitry comprises a printed circuit board having specifically routed traces to connect pins on the core connector to appropriate pins on the target connector.

26. The adaptor device of claim 1, wherein the connector circuitry further comprises a plurality of shunt resistors to couple appropriate traces between the core connector and the target connector.

27. An adaptor device for joining a first device with a plurality of second devices, said adaptor device comprising:
a housing body;
metal contacts contained within said housing body that make contact on one end with a connector of said first device;
metal contacts contained within said housing body that make contact on another end with one or more of a plurality of connectors of second devices, with certain metal contacts being reserved to accommodate each of said plurality of connectors; and
connector circuitry contained within said housing body including a plurality of circuits to connect particular pin contacts on said connector of said first device with particular pin contacts on a connector of a particular second device based on identity of metal contacts of each of said plurality of connectors of said second devices, wherein the plurality of circuits employ a minimum common denominator set of circuit lines to interact with each of the plurality of second devices.

28. The device of claim 27, wherein said first device is a digital camera and said second device is a cellular telephone.

29. The device of claim 28, wherein said adaptor device enables a digital camera to be connected to a plurality of cellular telephones having different connectors.

30. The device of claim 27, wherein said housing body is a molded plastic part.

31. The device of claim 27, wherein said housing body is double-ended.

32. The device of claim 27, wherein said metal contacts make contact on one end with a first connector having a certain number of pins and on another end with a connector having a number of pins different than said first connector.

33. The device of claim 27, wherein said metal contacts make contact with a connector having at least 15 pins on one end and with a connector having at least 26 pins on another end.

34. The device of claim 27, wherein said housing body includes geometry on at least one end to mate with a connector of a particular first device.

35. The device of claim 27, wherein said housing body includes geometry on at least one end to mate with a connector of a particular digital camera.

36. The device of claim 27, further comprising:
    latch features on said housing body for maintaining connectivity to said first device.

37. The device of claim 36, wherein said latch features include a button for release of said latch features.

38. The device of claim 36, wherein said latch features include features enabling release of said latch features with a specific tool.

39. The device of claim 38, further comprising:
    a specific tool for release of said latch features.

40. The device of claim 27, wherein at least one end of said housing body includes contoured surfaces to facilitate mating of said body housing to said first device.

41. The device of claim 27, wherein at least one end of said housing body includes contoured surfaces to facilitate mating of said body housing to said second device.

42. A device for joining a client device and a plurality of host devices, said device comprising:
    a core connector of the device providing connectivity to a client device;
    connector circuitry including a plurality of circuits, coupled to said core connector, for connecting said core connector to each of a plurality of disparate target connectors; and
    a plurality of target connectors, each target connector capable of being coupled to said core connector via said plurality of circuits and providing connectivity to a particular host device based an identity of a target connector and the particular host device, wherein the plurality of circuits employ a minimum common denominator set of circuit lines to interact with each of the plurality of host devices that fit the target connector.

43. The device of claim 42, wherein said client device is a digital camera.

44. The device of claim 42, wherein each said target connector provides connectivity to a particular type of cellular phone.

45. The device of claim 42, wherein said connector circuitry comprises a printed circuit board (PCB) including a set of routed traces to connect particular pin contacts on said core connector with said plurality of target connectors.

46. The device of claim 42, wherein said connector circuitry includes shunt resistors for purposes of connecting said core connector with said plurality of target connectors.

47. An adaptor comprising:
    a first end of the adaptor to connect to a camera s connector;
    a core camera connector of the adaptor, the core camera connector including a plurality of circuits, that create the set of electrical connections, to route data to an appropriate portion of a phone connector, based on an identity of the phone connector and the one of the plurality of target phones, wherein the plurality of circuits employ a minimum common denominator set of circuit lines to interact with each of the plurality of target phones that fit the target phone connector; and
    a target phone connector of the adaptor to fit one of a plurality of target phones, the core camera connector creating a set of electrical connections between the camera's connector and the target phone connector via the core camera connector.

48. The adaptor of claim 47, wherein the electrical connections are designed to transmit data signals comprising image data between a camera and one of the plurality of target phones.

49. The adaptor of claim 47, wherein the adaptor comprises two separate units, a first unit containing the first end and the core camera connector, and a second unit containing a target phone connector.

* * * * *